United States Patent Office 3,793,457
Patented Feb. 19, 1974

---

3,793,457
THERAPEUTICALLY ACTIVE PHENYLALKANE DERIVATIVES
Stewart Sanders Adams, Bernard John Armitage, and John Stuart Nicholson, all of 1 Thame Road W., Nottingham, England, and Antonio Ribera Blancafort, Joaquim Costa 47-8° Izqda, Madrid, Spain
No Drawing. Application July 25, 1969, Ser. No. 845,033, which is a continuation-in-part of application Ser. No. 425,624, Jan. 14, 1965, now abandoned. Divided and this application Nov. 21, 1972, Ser. No. 308,558
Int. Cl. A61k 27/00
U.S. Cl. 424—317                    10 Claims

ABSTRACT OF THE DISCLOSURE 2-(2-fluoro-4-biphenylyl)propionic acid, 2-(2'-fluoro-4-biphenylyl)propionic acid and 2-(2,2'-difluoro-4-biphenylyl)propionic acid possessing great anti-inflammatory, analgesic, and antipyretic activities.

---

This is a division of application Ser. No. 845,033, filed July 25, 1969 which is, in turn, a continuation-in-part of Ser. No. 425,624, filed Jan. 14, 1965 now abandoned, in which application the presently-claimed compounds appeared in Example 1, p. 13, line 20, Example 1, p. 14, line 1, and in the specification at line 6, page 4.

The invention provides novel compounds selected from the group consisting of 2-(2-fluoro-4-biphenylyl)propionic acid,
2-(2'-fluoro-4-biphenylyl)propionic acid, and
2-(2,2'-difluoro-4-biphenylyl)propionic acid.

These compound possess anti-inflammatory, analgesic and antipyretic properties and are useful for the treatment of anti-inflammatory conditions, conditions of pain, and pyretic conditions, individually or in any combination. In all these activities they are at least 75 times as potent as aspirin, and are mostly far in excess of 100 times as potent as aspirin.

These compounds may conveniently be prepared by reacting an ester of the appropriate substituted 4-biphenylylacetic acid with diethyl carbonate to give a malonic acid ester, methylating the sodium derivative of this ester, hydrolyzing the ester, and decarboxylating the resulting acid, e.g.

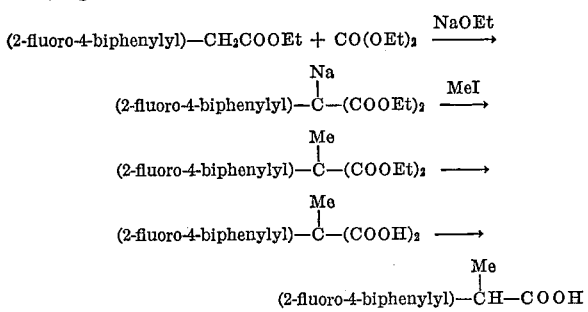

The compounds of the invention have been examined in experimental animals using pharmacological tests which are known to be capable of characterizing compounds possessing the therapeutic properties of aspirin, namely anti-inflammatory, analgesic, and antipyretic activity.

The tests were carried out as follows:

(a) Anti-inflammatory activity

This was determined by the method of Adams and Cobb, Nature, 1958, 181, 773. Female guinea pigs (Tuck strain) weighing 500–900 g. were fasted overnight and an area of the back depilated on the morning of the test. The animals were dosed with the compounds under test and, 30 minutes later, a part of the depilated area was exposed for 20 seconds to ultraviolet radiation from a Hanovia "Kromayer" lamp applied directly to the skin. Two hours later, the degree of erythema (redness) was visually determined and given a score of 0, 1, 2, 3 or 4 by a trained observer who was unaware of the dosage schedules. The compounds were administered orally in 10% acacia mucilage, control animals (giving a score of 4) receivng the mucilage only. In the case of aspirin, three dosage rates of 160, 80 and 40 mg./kg. were used and in the cases of the compounds of the invention seven dosage rates of 2.0, 1.0, 0.5, 0.25, 0.125, 0.062 and 0.031 mg./kg. were used. Ten guinea pigs were employed for each dosage level and as controls.

Dose response curves for each compound were plotted (i.e. dosage against degree of erythema) and approximate $E.D._{50}$'s in mg./kg. were determined from these curves; the $E.D._{50}$ is that dose of a compound which reduces the degree of erythema scored as 4 (as given by the controls) by a half i.e. to a degree of erythema scored as 2. The activity of the compounds of the invention was then determined in terms of the potency of aspirin.

(b) Analgesic activity

This was determined by a modification of the method of Randall and Selitto, Arch. int. Pharmacodyn. 1957, 111, 409, except that pressure was applied to the plantar surface of the foot by means of a vertically-fixed glass syringe bearing a conical perspex attachment on the plunger instead of a bullet-shaped wooden plug.

Male rats (Boots Wistar strain) weighing 110–180 g. were fasted overnight and the next morning, inflammation was produced in a hind foot by the sub-plantar injection of 0.1 ml. of a 20% suspension of dried yeast in distilled water. Doses of compounds under test were administered orally 30 minutes before the yeast injection and the pain threshold was determined 2 hours after the yeast injection.

The pain threshold for each rat was recorded as the pressure in mm. Hg. required to produce a squeak or withdrawal of the foot from the plunger; the threshold was determined twice for each rat. The compounds were administered orally in 10% acacia mucilage, control animals receiving the mucilage only. In the case of aspirin, three dosage rates of 240, 120 and 60 mg./kg. were used, and in the cases of the compounds of the invention six dosage rates of 4.0, 2.0, 1.0, 0.5 0.25 and 0.125 mg./kg. were used. Twenty-two rats were employed for each dosage level and as controls. Dose response curves for each compound were plotted (i.e. dosage against pressure causing squeak or foot removal) and the activity of the compounds of the invention was determined in terms of the potency of aspirin.

(c) Antipyretic activity

Male rats (Boots Wistar strain) of 150–230 g. weight were used. They were injected subcutaneously with 1 ml./100 g. body weight of a 20% suspension of dried yeast in water at 10.00 hours and fasted overnight. The following morning the rectal temperature of each rat was determined and only rats with a temperature higher than 38.2° C. were used. The animals were then dosed orally with the compounds under test and the rectal temperature of each was recorded at 1, 2 and 4 hours after dosing. The mean fall in ° C. compared with the predosing temperature was then determined. The compounds were administered orally in 10% acacia mucilage, control animals receiving the mucilage only.

In the case of aspirin, four dosage rates of 200, 100, 50 and 25 mg./kg. were used, and in the cases of the compounds of the invention eight dosage rates of 4, 2, 1, 0.5, 0.25, 0.125, 0.062 and 0.031 mg./kg. were used. Ten rats were employed for each dosage level and as controls.

Dose response curves for each compound were plotted (i.e. dosage against mean fall in temperature in 0° C.) and the activity of the compounds of the invention was detemined in terms of the potency of aspirin.

(d) Acute toxicity

This was determined in the conventional manner. Compounds under test were administered orally in 10% acacia mucilage in single doses to mice. In the case of aspirin, dosage rates of 2000, 1800, 1500, 1100 and 800 mg./kg. were used with eight mice per dosage rate; in the cases of 2 - (2-fluoro-4-biphenylyl)propionic acid, 2-(2'-fluoro-4 - biphenylyl)-propionic acid and 2-(2,2'-difluoro-4-biphenylyl)propionic acid, six, four and five mice respectively were used per dosage rate, the dosage rates being 1000, 500 and 250 mg./kg. Seven days after dosing, dose response curves for each compound were plotted (i.e. dosage against number of mice killed) and approximate $L.D._{50}$'s were determined from these curves; the $L.D._{50}$ is that dose of a compound in mg./kg. which results in the death of 50% of the mice.

The results of the tests described above are shown in the following tables; for the sake of brevity, the compounds have been accorded code letters as follows:

Compound A: Aspirin
Compound B: 2-(2-fluoro-4-biphenylyl)propionic acid
Compound C: 2-(2'-fluoro-4-biphenylyl)propionic acid
Compound D: 2-(2,2'-difluoro-4-biphenylyl)propionic acid The figures shown in columns 2 and 3 were obtained as described in tests (a), (b), (c) and (d). The figures shown in column 4 are the quotients obtained by dividing the $L.D._{50}$ of aspirin by the $L.D._{50}$'s of each of the compounds B, C and D; thus compounds B, C and D are 1.2–2.4 times more toxic than aspirin in test (d). The therapeutic indexes shown in column 5 are the quotients obtained by dividing the activity (in terms of the potency of aspirin) of each of compounds B, C and D by the toxicity (in terms of the toxicity of aspirin) of each of compounds B, C and D, i.e. the figure in column 5 is the figure in column 2 divided by the figure in column 4 in respect of each compound.

TABLE I
[Test (a)]

| 1 | 2 | 3 | 4 | 5 |
|---|---|---|---|---|
| Compound | Anti-inflammatory activity in terms of the potency of aspirin | Approx. oral $L.D._{50}$ in mice (mg./kg.) | Approx. toxicity in terms of the toxicity of aspirin | Therapeutic index |
| A | 1 | 1,200 | 1 | 1 |
| B | 240 | 500–1,000 | 1.2–2.4 | 100–200 |
| C | 240 | 500–1,000 | 1.2–2.4 | 100–200 |
| D | 320 | 500–1,000 | 1.2–2.4 | 133–266 |

TABLE II
[Test (b)]

| 1 | 2 | 3 | 4 | 5 |
|---|---|---|---|---|
| Compound | Analgesic activity in terms of the potency of aspirin | Approx. oral $L.D._{50}$ in mice (mg./kg.) | Approx. toxicity in terms of the toxicity of aspirin | Therapeutic index |
| A | 1 | 1,200 | 1 | 1 |
| B | 180 | 500–1,000 | 1.2–2.4 | 75–150 |
| C | >120 | 500–1,000 | 1.2–2.4 | >50–100 |
| D | 360 | 500–1,000 | 1.2–2.4 | 150–300 |

TABLE III
[Test (c)]

| 1 | 2 | 3 | 4 | 5 |
|---|---|---|---|---|
| Compound | Antipyretic activity in terms of the potency of aspirin | Approx. oral $L.D._{50}$ in mice (mg./kg.) | Approx. toxicity in terms of the toxicity of aspirin | Therapeutic index |
| A | 1 | 1,200 | 1 | 1 |
| B | 200 | 500–1,000 | 1.2–2.4 | 83–166 |
| C | 75 | 500–1,000 | 1.2–2.4 | 31.25–62.5 |
| D | 400 | 500–1,000 | 1.2–2.4 | 166–333 |

The compounds of the invention may be administered in the conventional manner of aspirin or usual manner for other anti-inflammatory, analgesic, and antipyretic agents, for example orally, topically, rectally or parenterally, preferably orally, the optimum dosage rate varying with the choice of active ingredient and the route of administration. The unit dose may vary from 1 mg. to 500 mg. per subject per day; for oral administration the dosage rate is preferably 5–250 mg. per subject per day, most preferably 10–60 mg. per subject per day, optionally in divided doses.

In use, the compounds of the invention are administered in conventional formulations and accordingly the invention also provides therapeutic compositions which comprise a compound of the invention in association with pharmaceutical excipients known for the production of compositions for oral, topical, rectal or parenteral administration. These compositions preferably contain 0.1–90% by weight of a compound of the invention.

Compositions for oral administration are the preferred compositions of the invention, and these are the conventional pharmaceutical forms for such administration, such as for example tablets, capsules, lozenges, powders, effervescent granules, syrups and aqueous and oily suspensions. The excipients used in the preparation of these compositions are the excipients known in the pharmacist's art. Thus in the preparation of tablets, typical excipients include disintegrating agents, e.g., maize starch and lubricating agents, e.g., magnesium stearate; in the preparation of capsules, standard gelatin capsules may be used containing the active ingredient alone or admixed with a diluent. The liquid compositions may comprise as excipients water and sucrose to provide syrups, water, dispersing agents and suspending agents, e.g., sodium carboxymethylcellulose to provide aqueous suspensions, and a nontoxic oil, e.g., a vegetable oil such as arachis oil and a suspending agent to provide oily suspensions.

Compositions for rectal administration are the conventional pharmaceutical forms for such administration, such as for example suppositories with cocoa butter or polyethylene glycol bases.

Compositions for topical use are the conventional pharmaceutical forms for such application, such as ointments, creams and lotions. Ointments and creams may be water miscible or water-immiscible in character and include emulsions prepared from emulsifying waxes and oils and those prepared from water miscible polyethylene glycols. Lotions may comprise a solution in an aliphatic alcohol with 1–4 carbon atoms which may contain a small proportion of water.

Compositions for parenteral administration are the conventional pharmaceutical forms for such administration, for example sterile suspensions in aqueous or oily media or sterile solutions in propylene glycol.

In some formulations it may be beneficial to use compounds of the invention in the form of particles of very small size, such as for example, as obtained by fluid energy milling, e.g., micronizing.

The invention further provides a method of treating inflammatory conditions, conditions of pain and pyretic conditions, individually or in any combination, which comprises administering a compound of the invention, preferably orally. Salts, esters, amides and alcohols derived from a compound of the invention may be used in place of a compound of the invention as such derivatives appear to be metabolized by the animal body and be converted in the body into the corresponding acid. Long-acting preparations may be produced in this manner using esters or amides.

The products of the present invention may of course be employed in combination with each other, or with other active anti-inflammatory agents, analgesics, and antipyretic agents, or with other drugs, as is already conventional in the art for other existing anti-inflammatory, analgesic and antipyretic materials such as aspirin.

The following nonlimitative examples illustrate the invention.

EXAMPLE 1

2-(2-fluoro-4-biphenylyl)propionic acid

A mixture of 4-acetyl-2-fluorobiphenyl, M.P. 95–96° C., (73.5 g.) [prepared from 4-bromo-3-nitroacetophenone (Oelschlager, Ann., 1961, 641, 81) via 4-acetyl-2-nitrobiphenyl, M.P. 106–108° C. (Ullman reaction), 4-acetyl-2-aminobiphenyl, M.P. 124–125° C. (reduction), and finally the Schiemann reaction], sulphur (17.4 g.) and morpholine (87 ml.) was refluxed for 16.5 hours, and then the resulting thiomorpholide was hydrolysed by refluxing with glacial acetic acid (340 ml.), concentrated sulphuric acid (54 ml.) and water (78 ml.) for 24 hours. The cooled solution was diluted with water, and the precipitated crude 2-fluoro-4-biphenylylacetic acid was collected. (A sample was purified by recrystallization to give M.P. 143–144.5° C.; Found: C, 73.2; H, 4.8. $C_{14}H_{11}FO_2$ requires C, 73.1; H, 4.8%.)

A sodium carbonate solution of the crude acetic acid was washed with ether and then acidified with hydrochloric acid; the required acid was isolated via an ether extraction and was esterified by refluxing for 6 hours with ethanol (370 ml.) and concentrated sulphuric acid (15 ml.). Excess alcohol was distilled, the residue diluted with water and the required ester isolated in ether. Distillation finally gave ethyl 2-fluoro-4-biphenylylacetate, B.P. 134–136° C./0.25 mm.

This ester (70 g.) and diethyl carbonate (250 ml.) were stirred at 90–100° C. whilst a solution of sodium ethoxide [from sodium (7.8 g.) and ethanol (154 ml.)] was added over 1 hour. During addition, ethanol was allowed to distil and after addition distillation was continued until the column head temperature reached 124° C. After cooling the solution to 90° C., dimethyl sulphate (33 ml.) was added followed by a further 85 ml. of diethyl carbonate. This solution was stirred and refluxed for 1 hour and then, when ice cool, was diluted with water and acetic acid (10 ml.). The malonate was isolated in ether and fractionally distilled to yield a fraction boiling at 148–153° C./0.075 mm., identified as the alpha-methyl malonate. This was hydrolyzed by refluxing for 1 hour with 2.5 N sodium hydroxide (350 ml.) and alcohol (175 ml.), excess alcohol was distilled and the residual suspension of sodium salt was acidified with hydrochloric acid to give a precipitate of the alpha-methyl malonic acid. This was decarboxylated by heating at 180–200° C. for 30 minutes and recrystallized from petroleum ether (B.P. 80–100° C.) to give 2-(2-fluoro-4-biphenylyl)propionic acid, M.P. 110–111° C. (Found: C, 74.2; H, 5.4. $C_{15}H_{13}FO_2$ requires C, 73.8; H, 5.3%.)

EXAMPLE 2

2-(2'fluoro-4-biphenylyl)propionic acid 4-acetyl-2'-fluorobiphenyl, B.P. 145–150° C./2 mm. (179.5 g.) (Renoll, J. Amer. Chem. Soc., 1946, 68, 1159), morpholine (133 ml.) and sulphur (42.4 g.) were refluxed for 16 hours, cooled, and a mixture of glacial acetic acid (532 ml), concentrated sulphuric acid (83 ml.) and water (126 ml.) added. This mixture was refluxed for 24 hours, cooled, diluted with water and the precipitated crude 2'-fluoro-4-biphenylylacetic acid was collected. (A sample recrystallized from petroleum ether B.P. 80° C.–100° C. had a M.P. of 99–101° C.)

A sodium carbonate solution of the crude acetic acid was filtered and the filtrate acidified with dilute hydrochloric acid; the required acetic acid was isolated via an ether extraction and was esterified by refluxing for 6 hours with ethanol (600 ml.) and concentrated sulphuric acid (27 ml.). Excess alcohol was distilled in vacuo and the required ester isolated in ether. Distillation finally gave ethyl 2'-fluoro-4-biphenylylacetate, B.P. 144° C./0.25 mm., M.P. 42–48° C. (Found: C, 74.6; H, 6.1. $C_{16}H_{15}FO_2$ requires C, 74.4; H, 5.8%.)

Sodium ethoxide [from sodium (15.6 g.) and ethanol (308 ml.)] was added over 65 minutes to a stirred mixture of ethyl 2'-fluoro-4-biphenylylacetate (140 g.) and diethyl carbonate (500 ml.) maintained at 90°–100° C. During the addition, ethanol was allowed to distil and after addition distillation was continued until the column head temperature reached 124° C. After 15 minutes at this temperature diethyl carbonate (150 ml.) was added and the slurry cooled to 90° C. Dimethyl sulphate (66 ml.) and diethyl carbonate (20 ml.) were then added dropwise, the mixture was stirred and refluxed for 1 hour, cooled to room temperature and diluted with water (500 ml.) containing glacial acetic acid (10 ml.). The malonate was isolated in ether and distilled, B.P. 168–170° C./0.3 mm.; the distillate was melted and diluted with petroleum ether, B.P. 40–60° C. (300 ml.), cooled to 20° C. and the resulting solid ethyl 2-(2'-fluoro-4-biphenylyl)-2-methylmalonate collected, M.P. 58–60.5° C. (Found: C, 69.4; H, 6.1. $C_{20}H_{21}FO_4$ requires C, 69.7; H, 6.1%.)

This ester (139 g.) was hydrolysed by refluxing for 1 hour with sodium hydroxide (660 ml. of 2.5 N) and alcohol (330 ml.). The resulting solution was concentrated in vacuo until a distillate of about 300 ml. had been collected, and the warm residue solution was acidified with concentrated hydrochloric acid to give a precipitate of the alpha-methylmalonic acid. This was decarboxylated by heating at 190–200° C. for 25 minutes and recrystallised from benzene (45 ml.)/petroleum ether, B.P. 80–100° C. (135 ml.) to give 2-(2'-fluoro-4-biphenylyl)-propionic acid, M.P. 94.5–97° C. (Found: C, 73.7; H, 5.5. $C_{15}H_{13}FO_2$ requires C, 73.8; H, 5.3%.)

EXAMPLE 3

2-(2,2'-difluoro-4-biphenylyl(propionic acid 2-bromonitrobenzene (Beilstein, vol. 5, p. 247; 58 g.) and 2,5-dibromonitrobenzene (Beilstein, vol. 5, p. 250; 81 g.) in nitrobenzene (250 ml.) were heated at 170–180° C. while copper powder (70 g.) was added over 15 minutes. The reaction mixture was stirred at 180° C. for 15 minutes, cooled and filtered, and the filtrate evaporated under reduced pressure. The residue was extracted into chloroform, the extract dried and evaporated, and the solid recrystallized several times from methanol to give 4-bromo-2,2'-dinitrobiphenyl, M.P. 145–147° C. (Found: Br, 24.6 $C_{12}H_7BrN_2O_4$ requires Br, 24.8%.)

4-bromo-2,2'-dinitrobiphenyl (50 g.) was Soxhlet extracted into a stirred refluxing mixture of alcohol (750 ml.), stannous chloride (330 g.) and concentrated hydrochloric acid (350 ml.). After refluxing for 30 minutes, the solvent was removed by distillation and the residue poured onto ice (1 kg.) and 5 N sodium hydroxide (500 ml.). More alkali was added until the inorganic solids dissolved. The product was isolated in ether; distillation (B.P. 140–190° C./0.2 mm.) followed by crystallization from petroleum ether, B.P. 62–68° C., gave 4-bromo-2,2'-diaminobiphenyl, M.P. 61–62° C. (Found: Br, 30.7; N, 10.7. $C_{12}H_{11}BrN_2$ requires Br, 30.4; N, 10.6%.)

This compound (10 g.) was dissolved in a mixture of tetrahydrofuran (20 ml.) and fluoroboric acid (38 ml. of 40%) and treated with a solution of sodium nitrite (6 g.) in water (10 ml.) at 0° C. After stirring at 0° C. for 15 minutes, the solid was filtered off, washed with 4% fluoroboric acid, ether/ethanol (9:1) and dry ether, and dried over phosphorus pentoxide. This solid fluoroborate was suspended in dry xylene (100 ml.) and heated under reflux until vigorous evolution of boron trifluoride occurred. Heating was continued for 1 hour after the reaction had subsided, the mixture was cooled and then stirred with 5 N sodium hydroxide (100 ml.). The organic layer was evaporated at atmospheric pressure and the residue distilled in vacuo, B.P. 135–140° C./3 mm. Recrystallisation from petroleum ether, B.P. 40–60° C., at −20° C. gave 4-bromo-2,2'-difluorobiphenyl, M.P. 45–46° C. (Found: C, 53.6; H, 2.7; Br, 29.3. $C_{12}H_7BrF_2$ requires C, 53.5; H, 2.6; Br, 29.8%.)

This compound (4 g.), cuprous cyanide (3.28 g.) and dimethylformamide (25 ml.) were stirred under reflux for 4 hours. The solution was then poured into a mixture of ferric chloride (6 g.), water (20 ml.) and concentrated hydrochloric acid (2.5 ml.). The mixture was kept at 70–80° C. for 20 minutes, cooled in ice and the solid collected. Recrystallisation from petroleum ether, B.P. 80–100° C., gave 4-cyano-2,2'-difluorobiphenyl, M.P. 78–79° C. (Found: C, 72.8; H, 3.6. $C_{13}H_7F_2N$ requires C, 72.6; H, 3.3%.)

This compound (4.76 g.) in ether (100 ml.) was added to methyl magnesium iodide made from magnesium (2.64 g.), methyl iodide (6.2 ml.) and ether (50 ml.). After overnight refluxing, 2 N hydrochloric acid (100 ml.) was added at a rate such as to keep the ether distilling off gently.

After cooling, the mixture was extracted with methylene chloride; washing with sodium bicarbonate solution, evaporation and crystallisation at −25° C. from petroleum ether, B.P. 40–60° C., gave crude 4-acetyl-2,2'-difluorobiphenyl.

This compound (2.4 g.), sulphur (0.65 g.) and morpholine (7.5 ml.) were refluxed overnight; the solution was cooled and glacial acetic acid (25 ml.), water (7.5 ml.) and concentrated sulphuric acid (5 ml.) added. After refluxing for 7 hours, the mixture was poured into water (250 ml.) and the product isolated in ether. Evaporation and crystallisation from petroleum ether, B.P. 62–68° C., gave 2,2'-difluoro - 4 - biphenylylacetic acid, M.P. 126–127° C. (Found: C, 67.7; H, 4.5. $C_{14}H_{10}F_2O_2$ requires C, 67.7; H, 4.0%.)

This acid (8.1 g.) was esterified in the conventional manner using ethanol/concentrated sulphuric acid to give ethyl 2,2'-difluoro-4-biphenylylacetate, B.P. 120–124° C./0.05 mm. This ester (7.47 g.) and diethyl carbonate (75 ml.) were stirred at 90–100° C. Whilst a solution of sodium ethoxide [from sodium (0.78 g.) and ethanol (50 ml.)] was added over 10 minutes. During addition, ethanol was allowed to distill and after addition, distillation was continued until the column head temperature reached 124° C. After cooling to 90° C., dimethyl sulphate (4.3 g.) was added and the mixture refluxed for 1 hour, cooled, diluted with water and neutralised with acetic acid. The malonate was isolated in ether and distilled to give diethyl 2 - (2,2'-difluoro-4-biphenylyl)-2-methylmalonate, B.P. 160–164° C./0.1 mm.

This compound (3.19 g.) was refluxed for 1 hour with ethanol (10 ml.) and 2.5 N sodium hydroxide (25 ml.), excess alcohol was distilled and the residue acidified with dilute hydrochloric acid. The malonic acid thus obtained was decarboxylated by heating at 180° C. for 20 minutes and recrystallised from benzene and from petroleum ether, B.P. 80–100° C., to give 2-(2,2'-difluoro-4-biphenylyl)propionic acid, M.P. 120.5–123° C. (Found: C, 68.8; H, 4.7. $C_{15}H_{12}F_2O_2$ requires C, 68.7; H, 4.6%.)

EXAMPLE 4

Compositions—hard gelatin capsules

No. 5 hard gelatin capsules were prepared each containing the following:

| | Mg. |
|---|---|
| (a): | |
| 2-(2-fluoro-4-biphenylyl)propionic acid | 5 |
| Lactose | 95 |
| (b): | |
| 2-(2-fluoro-4-biphenylyl)propionic acid | 5 |
| Calcium phosphate | 5 |
| Maize starch | 90 |
| (c): | |
| 2-(2-fluoro-4-biphenylyl)propionic acid | 5 |
| Maize starch ⎫ | |
| Lactose ⎬ Equal parts by weight | 95 |
| Calcium phosphate ⎭ | |

In the same manner, the other compounds of the present invention, namely 2-(2'-fluoro-4-biphenylyl)propionic acid and 2-(2,2'-difluoro-4-biphenylyl)propionic acid, are incorporated into composition forms and the composition enclosed in hard gelatin capsules.

When used as described hereinbefore, these compositions of the products of the present invention produce the desired results already fully documented herein.

EXAMPLE 5

Compositions—tablets

The following mixture (parts by weight) was formed into tablets in conventional manner, each tablet containing 5 mg. of active ingredient:

| | |
|---|---|
| 2-(2-fluoro-4-biphenylyl)propionic acid | 5 |
| Maize starch | 30 |
| Lactose | 163 |
| Stearic acid | 1 |
| Magnesium stearate | 1 |

In the same manner, the other compounds of the invention, namely 2-(2'-fluoro-4-biphenylyl)propionic acid and 2-(2,2'-difluoro - 4 - biphenylyl)propionic acid, are combined with conventional tableting excipients and binders, and formed into tablets in the conventional manner in a tablet-making device.

When used as described hereinbefore, these compositions of the products of the present invention produce the desired results already fully documented herein.

In the same manner, the compounds of the present invention are incorporated into other conventional compositions and formulations, taking various conventional forms, and administered as previously described to give the desirable relief described, depending upon the physiological abnormality or condition being treated.

What is claimed is:

1. A therapeutic composition useful in the treatment of pain, inflammation, and pyretic conditions which comprises a compound selected from the group consisting of 2-(2-fluoro-4-biphenylyl)propionic acid, 2-(2'-fluoro-4-biphenylyl)propionic acid, and 2-(2,2'-difluoro-4-biphenylyl)propionic acid in association with a pharmaceutically acceptable excipient the amount of said compound present in said composition being an amount effective against at least one of said conditions.

2. The composition of claim 1 wherein the active ingredient is 2-(2-fluoro-4-biphenylyl)propionic acid.

3. The composition of claim 1 wherein the amount of said compound is at least 5 milligrams.

4. The composition of claim 1 wherein the amount of said compound is at least 1 milligram.

5. A method of treating inflammatory an effective antiinflammatory amount of conditions which comprises administering to a subject affected with inflammation a compound selected from the group consisting of 2-(2-fluoro-4-biphenylyl)propionic acid, 2-(2'-fluoro - 4 - biphenylyl)propionic acid, and 2-(2,2'-difluoro - 4 - biphenylyl)propionic acid.

6. A method according to claim 5 wherein the compound is 2-(2-fluoro-4-biphenylyl)propionic acid.

7. A method of treating conditions of pain which comprises administering to a subject suffering from pain an effective analgesic amount of a compound selected from the group consisting of 2-(2-fluoro - 4 - biphenylyl)propionic acid, 2-(2'-fluoro-4-biphenylyl)propionic acid, and 2-(2,2'-difluoro-4-biphenylyl)propionic acid.

8. A method according to claim 7 wherein the compound is 2-(2-fluoro-4-biphenylyl)propionic acid.

9. A method of treating pyretic conditions which comprises administering to a subject suffering from pyrexia an effective antipyretic amount of a compound selected from the group consisting of 2-(2-fluoro-4-biphenylyl)propionic acid, 2-(2'-fluoro-4-biphenylyl)propionic acid, and 2-(2,2'-difluoro-4-biphenylyl)propionic acid.

10. A method according to claim 9 wherein the compound is 2-(2-fluoro-4-biphenylyl)propionic acid.

No references cited.

STANLEY J. FRIEDMAN, Primary Examiner

U.S. Cl. X.R.

260—515

UNITED STATES PATENT OFFICE
CERTIFICATE OF CORRECTION

Patent No. 3,793,457  Dated February 19, 1974

Inventor(s) STEWART SANDERS ADAMS, ET AL.

It is certified that error appears in the above-identified patent and that said Letters Patent are hereby corrected as shown below:

PATENT READS:

No Assignee given

APPLICATION READS:

THE BOOTS COMPANY LIMITED

Signed and sealed this 8th day of October 1974.

(SEAL)
Attest:

McCOY M. GIBSON JR.
Attesting Officer

C. MARSHALL DANN
Commissioner of Patents

UNITED STATES PATENT AND TRADEMARK OFFICE

CERTIFICATE EXTENDING PATENT TERM
UNDER 35 U.S.C. 156

Patent No.    : 3,793,457

Dated         : Feb. 19, 1974

Inventor(s)   : Stewart Sanders Adams, et al

Patent Owner  : The Boots Company PLC

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

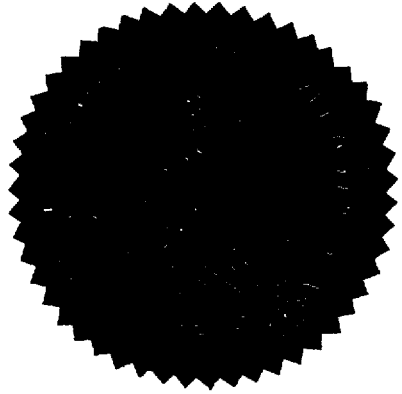

I have caused the seal of the Patent and Trademark Office to be affixed this Twenty-second day of March 1988.

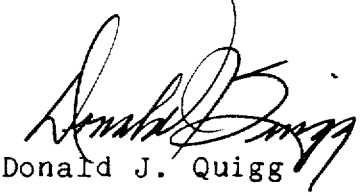

Donald J. Quigg

Assistant Secretary and Commissioner of Patents and Trademarks